Jan. 5, 1932. T. B. TYLER Re. 18,319

POSITIVE DRIVE CLUTCH

Original Filed March 19, 1926 3 Sheets-Sheet 1

Inventor

Tracy B. Tyler

By J. S. Murray

Attorney

Jan. 5, 1932. T. B. TYLER Re. 18,319
POSITIVE DRIVE CLUTCH
Original Filed March 19, 1926 3 Sheets-Sheet 2
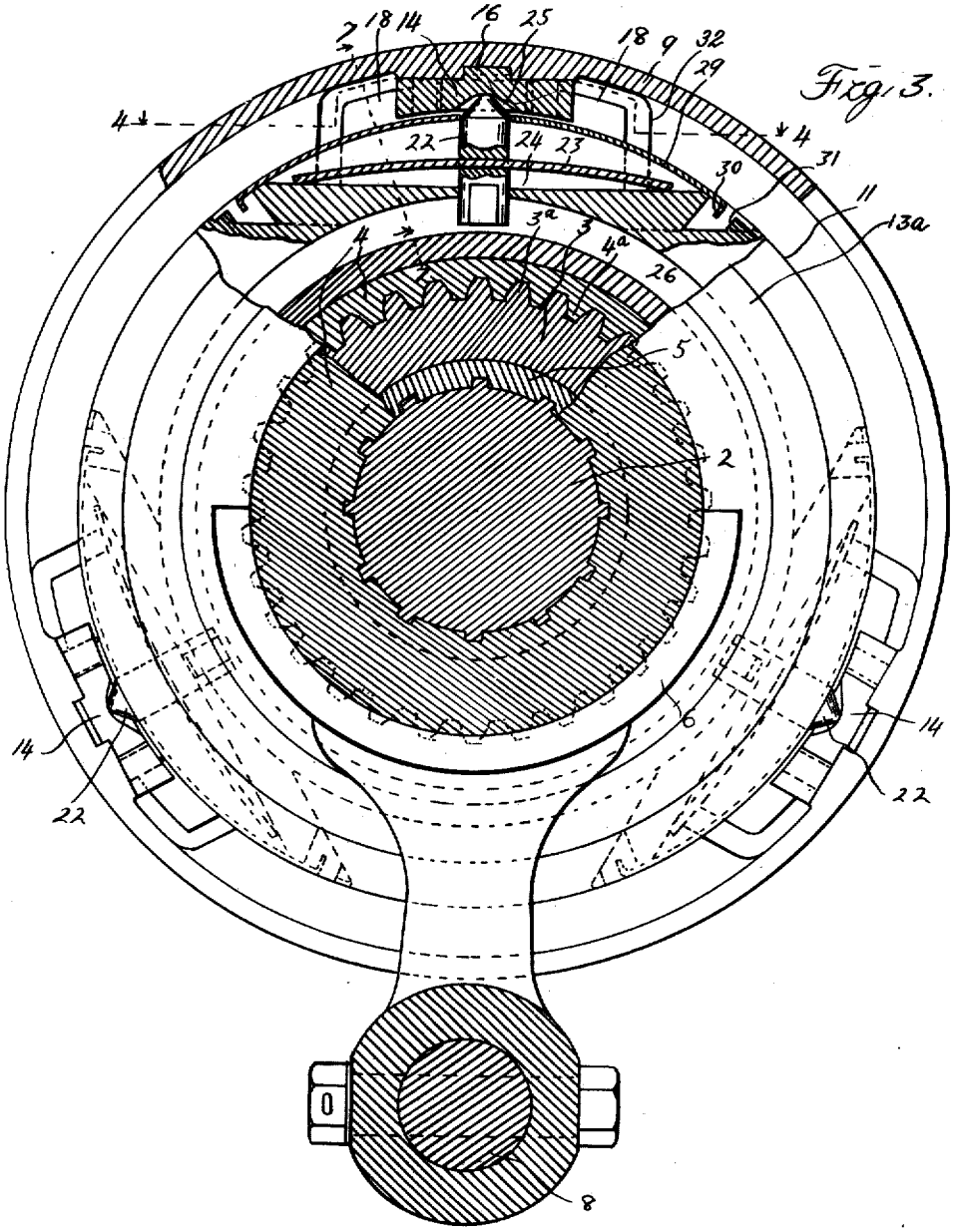
Inventor
Tracy B. Tyler
By J. D. Murray Attorney Jan. 5, 1932. T. B. TYLER Re. 18,319

POSITIVE DRIVE CLUTCH

Original Filed March 19, 1926 3 Sheets-Sheet 3

Inventor
Tracy B. Tyler

By J. D. Murray
Attorney

Reissued Jan. 5, 1932

Re. 18,319

UNITED STATES PATENT OFFICE

TRACY B. TYLER, OF DETROIT, MICHIGAN, ASSIGNOR, BY MESNE ASSIGNMENTS, TO GENERAL MOTORS RESEARCH CORPORATION, OF DETROIT, MICHIGAN, A CORPORATION OF DELAWARE

POSITIVE DRIVE CLUTCH

Original application filed March 19, 1926, Serial No. 95,916. Renewed July 12, 1928. Original No. 1,702,753, dated February 19, 1929. Application for reissue filed May 15, 1930. Serial No. 454,839.

This invention relates to clutches, and particularly relates to positive drive clutches.

It is an object of the invention to automatically and positively prevent contact of the drive elements of a pair of positive-drive clutch members which are not synchronously rotating, and to thus eliminate the clashing of such members and the resultant heavy wear and frequent breakage occurring in constructions now commonly used.

More specifically, it is an object of the invention to associate with a pair of power transmitting members provided with co-acting positive drive clutch members, means acting frictionally or otherwise in response to a controlling effort to establish substantial synchronism of speeds of said clutch members, and to prevent any contact of the drive elements of said members until such synchronism has been established, whereupon the thrust exerted upon one of the positive clutch members to move it toward the other will effect a relative angular displacement of said positive clutch members and said means to establish synchronism which will permit interengagement of the positive clutch members.

Another object is to provide an automatic control means as above set forth which will not add appreciable resistance to turning of the clutch in the event that the same is packed in grease or the like.

Still another object is to provide a clutch having an automatic control mechanism of the above described character which will avoid the use of parts that may work loose and possibly damage any transmission elements driven through the clutch.

These and various other objects the invention attains by the construction hereinafter described and illustrated in the accompanying drawings, wherein:

Figure 3 is a transverse sectional view taken upon the line 3—3 of Figure 1.

Figure 1:
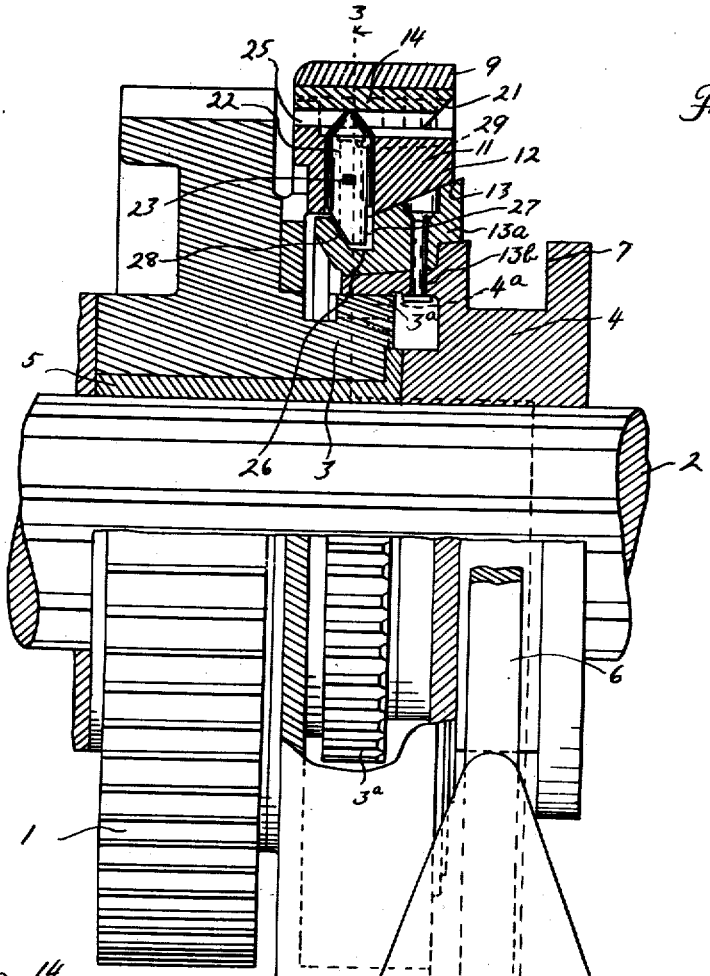
Figure 1 is a view in axial sectional elevation of the clutch with its members in driving engagement.

In these views, the reference character 1 designates a gear mounted to turn freely upon a shaft 2, and having a positive-drive male clutch member 3 formed integral therewith, and 4 designates a companion female clutch member turning with said shaft and slidable to engage or disengage the clutch member 3. The members 3 and 4 are formed with ordinary clutch teeth 3*a* and 4*a* respectively. While the described mounting of the parts on the shaft may be variously established, said shaft in the disclosed embodiment of the invention has spline ways receiving splines upon the clutch member 4, and the gear 1 with its integrally formed clutch member is journaled upon a sleeve 5 splined on the shaft and held from longitudinal travel thereon by any suitable means. Said gear 1 and said shaft 2 constitute two power transmitting members which may be coupled in driving relation by the toothed clutch members or elements 3 and 4.

For shifting the clutch member 4, a yoke 6 is engaged in an annular groove 7 in the said clutch member, as is common practice, said yoke being carried by a suitable control rod 8 actuable in parallelism with the shaft 2.

Surrounding the clutch member 3, a drum 9 is secured to the gear 1 by rivets 10 or in other suitable manner, said drum having a sufficient diameter to allow the clutch member 4 to lie within said drum when operatively engaging the clutch member 3 (see Fig. 1). 11 designates a control ring permanently connected to the drum 9 to rotate in substantial unison with said drum and slidable into and out of said drum, said ring having an annular female friction face 12, inclined to the axis of the clutch and engageable by a similar male friction face 13 on a control ring 13*a* attached to the clutch member 4 by rivets 13*b* or the like. Control rings 11 and 13*a* constitute frictionally engageable means adapted to bring the said power transmitting members 1 and 2 to substantially equal speeds before intermeshing the positive clutch elements 3 and 4.

Figure 6:
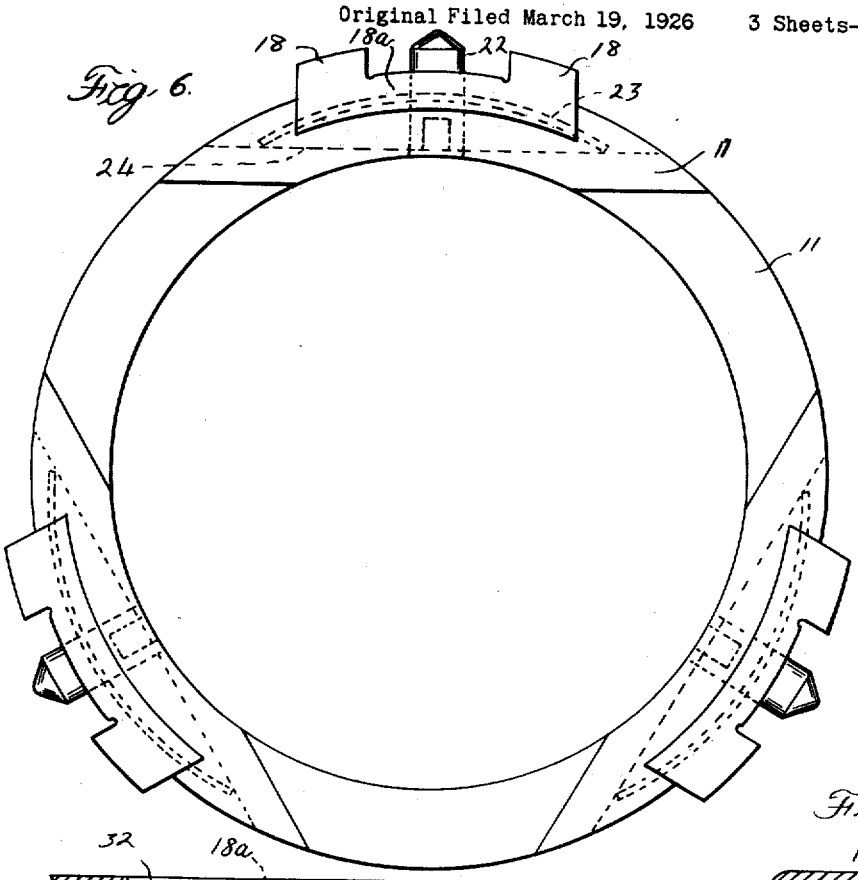
Figure 6 is a rear view of a ring which is axially slidable upon one of the clutch members showing the means carried by said ring for guiding its sliding travel.
Figure 4:
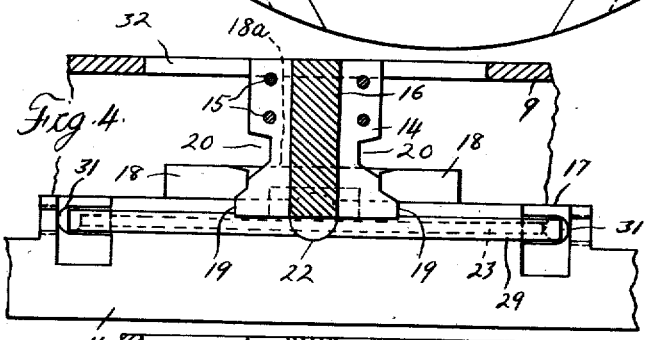
Figure 4 is a fragmentary section taken on the line 4—4 of Figure 3.
Figure 5:
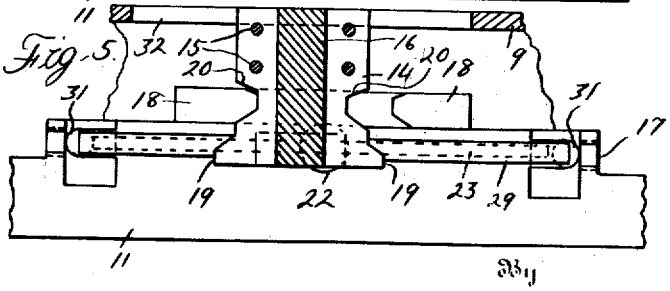
Figure 5 is a view similar to Figure 4 but showing the parts positioned to lock the sliding clutch member against further movement toward its companion member until the two are synchronously rotating.
Figure 7:
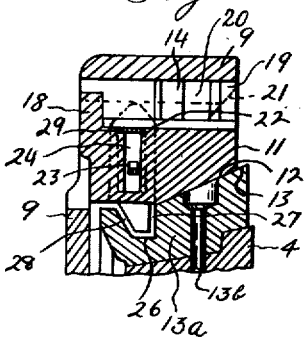
Figure 7 is a sectional view taken on the line 7—7 of Figure 3.

While the desired connection between the ring 11 and the drum 9 may be variously established, in the illustrated embodiment of the invention blocks or radial arms 14 are rigidly secured interiorly to said drum at suitable circumferentially spaced points to establish said connection. Rivets 15 are the means shown for holding said blocks in place, shearing stress upon said rivets being avoided by forming each block with a rib 16 fitting into a groove extending transversely of the drum in its inner face. As is best seen in Figs. 4, 5 and 6 the ring 11 has integral rearward projections 17 flush with its circumferential face and spaced correspondingly to the blocks 14. Upon each projection 17, there is integrally formed a pair of spaced lugs 18 which extend rearwardly and further extend outward to embrace the corresponding block 14, as best seen in Figures 4 and 5. Preferably said lugs have their inner ends integrally connected as indicated at 18*a* and are beveled. The width of the blocks 14 is slightly increased at their forward ends to form stops 19 engageable by the lugs 18 to limit sliding of the ring 11 outwardly from the drum. A pair of notches 20 of truncated V-form, each having an inclined rear wall or surface constituting a stop or detent element adapted to cooperate with the beveled surface of one or the other of said lugs 18, which thus constitutes a cooperating detent element, is formed oppositely in the sides of each block 14 a slight distance inward from the stops 19 and either of said notches is adapted to receive the corresponding lug 18 through a slight rotation of the ring 11 relative to the drum in order to set the detent elements or bring them into axial alinement for a purpose to be presently disclosed. (See Fig. 5.) Such rotation may occur, however, only after the ring has been shifted away from the stops 19 sufficiently to register said lugs with said notches.

The force acting axially to move the toothed clutch members toward intermeshing position is resolved into two components, one of which, owing to the inclination of the detent surfaces in a plane tangent to the arc of rotation is a force acting tangentially to the path of rotary movement of said detent elements.

Figure 2:
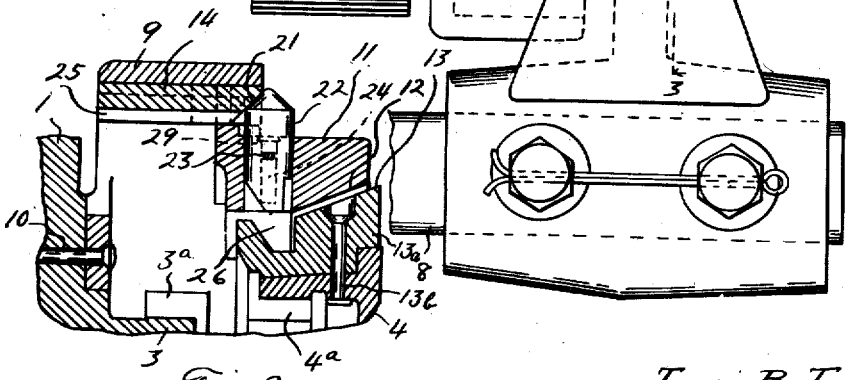
Figure 2 is a fragmentary sectional view corresponding to a portion of Figure 1, but showing the positions of the parts when the clutch members are separated.

The front end faces of the blocks 14 are beveled, as indicated at 21, and when the ring 11 is fully withdrawn from the drum 9, as seen in Figures 2 and 4, cylindrical plungers 22 slidable radially in said ring, bear at their outer ends against said faces 21, said ends being conically beveled to conform to the inclination of said faces. Each plunger 22 is outwardly urged by a bow spring 23 passing through the plunger and similarly projecting at each side thereof, the ring 11 being formed with channels 24 in its circumferential face receiving said springs. As the ring 11 is shifted into the drum 9, the plungers 22 are first retracted toward the center of said ring by the faces 21 of the blocks 14 and then enter shallow V-shaped grooves 25 extending in the inner faces of said blocks parallel to the clutch axis. The described retraction of the plungers projects their inner ends into an annular groove 26 in the clutch member 4, whereby upon separation of the clutch members the ring 11 is shifted out of the drum 9 by the clutch member 4. Preferably the inner end portions of the plungers 22 have their rear faces beveled as indicated at 28 and the rear wall of the groove 26 is correspondingly beveled, so that, as the ring 11 and clutch member 4 are being shifted to their forward limiting positions shown in Figure 2 the engaged beveled faces of the plungers and of the groove 26 will tend to throw the plungers out of said groove even if the springs 23 are broken or for any other reason fail to function.

It is preferred to so cover the channels 24 that in case of breakage of any of the springs 23 the piece thereof cannot escape and possibly do damage. As shown, elongated sheet metal covers 29 are employed to cover said channels, said covers being retained in dove-tailed channels co-extensive with the channels 24, the ends of said covers being inturned toward the axis of the clutch to enter radial bores 31 in said ring, whereby the covers are normally held from sliding in said dove-tailed channels.

32 designates openings in the web of the drum 9 adjacent to its periphery, said openings registering with the lugs 18 and receiving said lugs when the ring 11 is fully within the drum, as seen in Figure 1.

Considering now the operation of the described clutch, it is to be understood that when the members 3 and 4 are separated or in neutral, as Figure 2 illustrates, the ring 11 is withdrawn from the drum 9, and the plungers 22, responding to the springs 23, bear at their outer ends upon the inclined end faces 21 of the blocks 14. The pressure thus exerted by said pins holds the lugs 18 firmly against the stops 19, preventing any inward shifting of said ring and also avoiding any rattle of said ring. In the described position of the parts, the clutch member 4 is in a position slightly withdrawing its friction face 13 from that of the ring 11, said clutch member being held thus positioned by its control means 6, 8 in any suitable manner. In establishing a drive through the clutch, the initial sliding actuation of the member 4 brings the friction faces 12 and 13 into contact. Through said faces, the ring 11 is then moved by said clutch member sufficiently to register the lugs 18 with the notches 20. It is to be noted that the travel requisite to establish such registration is slight and not sufficient to contact the teeth of the clutch member 4 with those of the member 3. Assuming that the two clutch members are not synchronously rotating as is practically always the case, the ring 11 will immediately undergo the slight rotation permitted by entrance of one of the lugs 18 into the corresponding notch 20, responding to the rotative tendency derived from the clutch member 4 through the friction faces 12 and 13. This engagement of either lug 18 in the corresponding notch 20, according to the sense of rotation, locks the clutch member 4 against any further actuation toward the clutch member 3, controlling pressure upon the clutch member 4 acting only to increase the friction between the faces 12 and 13 and thus to synchronize the speeds of the two clutch members. When synchronism has thus been established, neither lug 18 will be rotatively urged into the corresponding notch 20 and the controlling effort acting axially upon the ring 11 will force the lugs 18 out of said notches due to the cam action of the inclined rear walls of the notches on said lugs allowing the block or arm 14 to enter the passage between the lugs. Thus travel of said ring into the drum 9 is no longer opposed, and as such travel is completed the clutch teeth 3*a* and 4*a* fully engage each other. As has already been described, the initial actuation of the clutch member 4 engages the outer ends of the plungers 22 with the beveled faces 21 of the blocks 14 retracting said plungers. The resistance initially offered by said plungers to sliding of the ring 11 creates a sufficient pressure between the friction faces 12 and 13 to give said ring the desired rotative impulse to cause entry of one of the lugs 18 in the corresponding notch 20 when registered with the latter. Retraction of the plungers 22 furthermore engages their inner portions in the groove 26 so that said plungers establish an interlock to move the member 4 and ring 11 in unison during retraction of the former. The V-shaped grooves 25 which receive the outer ends of the plungers 22 after retraction of said plungers aid in withdrawing either lug 18 from the corresponding notch 20, since the tendency of said grooves is to maintain the plungers and the pairs of lugs centered with respect to the blocks 14.

The described control device may be applied as an attachment to practically any positive drive clutch by simply fastening the drum 9 and synchronizing ring 13*a* to the co-acting clutch members, as shown, or in some other suitable manner. It is obvious, however, that said device may, if desired, be made an initial part of such a clutch instead of being applied as an attachment.

While the described clutch control mechanism is particularly desirable in connection with the change speed gears of a motor vehicle, it is apparent that the construction may be advantageously applied to any positive drive clutch for reducing the wear and danger of breakage.

It is of importance to note that the primary function of the control rings 11 and 13*a* is, through a limited rotation of the former ring to establish a temporary lock against continued advancement of the sliding clutch member until speed synchronization occurs. The effect of said rings in expediting such synchronization is in most cases incidental, since synchronization would occur without said members, but less rapidly. As the friction surfaces occupy a circumferential zone outside of the zone occupied by the positive clutch teeth a high mechanical advantage exists for synchronizing and a large area of frictional contact is obtainable. The friction surfaces are pressed into contact by the movement of slidable clutch member 4 acting against the resistance afforded by the inclined detent surfaces of lugs 18 and notches 20. Said detent surfaces also occupy a zone outside of the zone of the positive clutch teeth and are so disposed as to distribute the pressure upon ring 11 evenly without tending to distort it during synchronizing effect.

What I claim is:

1. The combination with a pair of co-axial clutch members, one slidable toward the other, said members having engageable positive-drive elements, and shifting means for said sliding member, of a pair of frictional speed synchronizing members carried one by each of said clutch members, and engageable responsive to an initial sliding of the slidable clutch member toward the companion clutch member, one of said synchronizing members being slidably actuable by the other parallel to the clutch axis, and further being adapted for a limited rotative actuation by the other synchronizing member with respect to its supporting clutch member, and means upon the last mentioned member stopping sliding travel of the sliding synchronizing member while it is rotatively shifted relative to its supporting clutch member, said drive elements being separated in the rotatively shifted position of the sliding synchronizing member, and being engageable by completion of the sliding travel of the sliding synchronizing member.

2. The combination with a pair of co-axial clutch members, having engageable positive drive elements, and means for actuating one of said members slidably to and from the other, of a drum mounted upon one of said members, a pair of annular speed synchronizing members, one carried by said drum, and slidable thereupon parallel to the clutch axis, and the other carried by the other clutch member; said synchronizing members being frictionally engageable responsive to an initial sliding of the slidable clutch member toward the companion member, and prior to engagement of said drive elements, means carried by said drum, guiding sliding travel of the sliding synchronizing member and establishing a rotative drive connection between the drum and said synchronizing member, said means providing for a limited relative rotary movement of the drum and synchronizing member and thereby preventing complete response of the sliding clutch member to a controlling effort and thereby holding the drive elements of the clutch members separated until the speeds of the clutch members are synchronized.

3. The combination with a pair of co-axial clutch members, one slidable toward the other, said members having engageable positive-drive elements, of a drum secured to one of said members, a pair of frictionally engageable speed synchronizing members, one mounted upon the other of said clutch members, and the other upon said drum, means interiorly carried by the drum driving the synchronizing member mounted on the drum in substantial unison with the drum, and guiding said member for sliding travel into and out of the drum, said means providing for a limited rotation of said member with respect to the drum in one position of sliding travel of said synchronizing member, and locking said member against continued sliding travel into the drum when rotatively shifted in said position, the drive elements of the clutch members being separated in said position of the sliding synchronizing member and being operatively engageable upon further actuation of said member into the drum.

4. The combination with a pair of co-axial clutch members having engageable positive-drive elements, and means for slidably actuating one of said clutch members to engage it with or disengage from the other, of a speed synchronizing member substantially fixed upon the sliding clutch member and having a friction face, a companion speed synchronizing member slidable upon the other clutch member, and having a friction face engageable by that of the first-named synchronizing member in advance of engagement of said drive elements, a mounting upon the other clutch member for said sliding synchronizing member establishing a rotative drive to the synchronizing member and guiding the same for sliding travel, and means locking the sliding synchronizing member from sliding travel automatically releasable upon speed synchronization of the two clutch members.

5. The combination with a pair of co-axial clutch members, having engageable positive drive elements, and actuating means for one of said clutch members, of a speed synchronizing member mounted upon one of said clutch members and slidable axially thereon and rotative in substantial unison therewith, a companion speed synchronizing member mounted upon the other clutch member and engageable with the first-named synchronizing member responsive to said actuating means in advance of engagement of said drive elements, means opposing axial actuation of the sliding synchronizing member by the companion synchronizing member until their speeds are substantially synchronized, and means upon the sliding synchronizing member engageable with the second clutch member for returning said synchronizing member to its normal position as the clutch members are being disengaged, and automatically disengageable upon arrival at said normal position.

6. The combination with a pair of co-axial clutch members, one actuable toward the other, having engageable positive drive elements, and control means for said clutch, of a speed synchronizing member mounted upon one of said clutch members and connected thereto to rotate in substantial unison therewith and to slide axially thereupon, a companion speed synchronizing member mounted upon the other clutch member, and engageable with the first mentioned synchronizing member responsive to actuation of the clutch, and in advance of engagement of said drive elements, to first effect substantial speed synchronization of the two clutch members and to then actuate the sliding synchronizing member in unison with the actuated clutch member, means restraining the sliding synchronizing member from complete response slidably to the companion synchronizing member until the speeds of the two clutch members are substantially synchronized, a plunger upon the sliding synchronizing member actuable substantially radially and having its inner end portion engageable, in a retracted position of said plunger, with the clutch member carrying the non-sliding synchronizing member, to connect the sliding synchronizing member to said clutch member during a portion of the travel of the actuable clutch member from the companion clutch member, and means normally projecting said plunger.

7. The combination with a pair of co-axial clutch members, herein distinguished as the first and second clutch members, having engageable positive drive elements, one of said members being actuable toward the other, of a pair of speed synchronizing members, one rigidly connected to the first clutch member, and the other slidable axially of the clutch relative to the second clutch member, said synchronizing members being engageable responsive to actuation of the clutch, in advance of engagement of said drive elements, and the sliding synchronizing member being adapted responsive to its engagement by the other synchronizing member to undergo a limited rotation with respect to the second clutch member, and being normally restrained from such limited rotation, and a stop engaged by the sliding synchronizing member through said limited rotation thereof, positively preventing sliding of said member, responsive to the companion synchronizing member, while engaged with said stop.

8. The combination with a pair of clutch members, one slidable toward the other, and having engageable positive drive elements, and means for shifting said sliding clutch member, of a pair of speed synchronizing members having normally spaced friction faces engageable through an advance of the sliding clutch member toward the other clutch member, in advance of engagement of said drive elements, said synchronizing members being movable with the sliding clutch member during engagement of the latter with the other clutch member, a guiding and driving member mounted on one of said clutch members, and elongated parallel to the clutch axis, and having a pair of opposite notches, and a pair of guiding and driving members carried by one of said synchronizing members embracing said notched member, and thereby driving said synchronizing member in substantial unison with said clutch member, said embracing members being alternatively engageable in the corresponding notches of the notched member in advance of engagement of said drive elements, and responsive to engagement of the two synchronizing members, and preventing engagement of said elements while in either of said notches.

9. An attachment for a pair of co-acting clutch members having positive drive elements, comprising a drum attachable to one of said clutch members, a synchronizing member rigidly attachable to the other clutch member, and a second speed synchronizing member mounted upon said drum and slidable axially of the drum responsive to its engagement by the first mentioned synchronizing member, and movable rotatably through initial engagement by said companion synchronizing member to lock it against further sliding travel, until the speeds of the clutch members are synchronized.

10. The combination with a pair of coaxial clutch members, one actuable toward the other, and having engageable positive drive elements, and control means for said actuable member, of a control member slidable upon one of said clutch members in the direction of the clutch axis, a co-acting control member carried by the other clutch member, said control members being frictionally engageable in response to an initial actuation of the clutch, and in advance of contact of said drive elements, and means upon the clutch member carrying the sliding control member positively resisting sliding of said control member, and thereby holding the drive elements of the clutch separated until speed synchronism is established.

11. The combination with a pair of coaxial clutch members, one slidable toward the other, and having engageable positive drive elements, and control means for shifting the sliding member, of a pair of control members, carried one by each of said clutch members, and engageable responsive to an initial actuation of the sliding clutch member, one of said control members being slidably actuable by the other parallel to the clutch axis, and further being adapted for a limited rotative actuation by the other control member with respect to its supporting clutch member, and means upon the last named clutch member stopping sliding of the sliding control member while said sliding member is rotatively shifted relative to its supporting clutch member, said drive elements being separated in the rotatively shifted position of the sliding control member, and being engageable by completion of the sliding travel of the sliding control member.

12. The combination with a pair of co-axial clutch members having engageable positive drive elements, and means for actuating one of said members to and from the other, of a drum mounted upon one of said members, a pair of annular control members, one carried by said drum, and slidable thereupon, parallel to the clutch axis, and the other carried by the other clutch member, said control members being frictionally engageable responsive to an initial actuation of the clutch, and prior to engagement of said drive elements, means carried by said drum guiding sliding travel of the sliding control member mounted thereon and establishing a rotative drive connection between the drum, and said control members, said means providing for a limited relative rotary movement of the drum and control member carried thereby, and thereby preventing a complete response of the sliding clutch member to a controlling effort, said drive elements of the clutch being separated in the rotatively shifted position of the sliding control member.

13. The combination of two coaxial power transmitting members, each provided with a positively driven toothed clutch element and a positively driven friction synchronizing element, said friction synchronizing elements being frictionally engageable one with the other by a relative axial movement in order to bring said power transmitting members into synchronous rotation prior to the intermeshing of said toothed clutch elements, which are also engageable by a relative axial movement, one of said friction synchronizing elements being connected to one of said power transmitting members so as to have a limited relative angular movement and a relative axial movement with respect thereto, said last named power transmitting element and friction synchronizing element having cooperating inclined detents arranged to be in axial alinement when the synchronizing element is at one end of its relative angular movement, the detents being disposed a radial distance from the axis at least equal to the radial distance of the zone of frictional contact between said friction synchronizing elements.

14. The combination of two power transmitting members, one of which is adapted to drive the other, including toothed intermeshable elements one of which is axially movable into and out of engagement with the other; a friction member fixed with respect to the movable toothed element, a second friction member capable of axial and limited rotary movement with respect to the other toothed element; said second friction member being provided with a detent, a cooperating detent fixed with respect to said other toothed element and arranged to aline with the detent on said second friction member when the latter is at the limit of said relative rotary movement, said detents functioning to obstruct engagement of the toothed elements during a synchronous rotation thereof, and to resolve the axial force exerted by the axial movement of the movable toothed element toward interengagement with its companion into an axial force tending to press the frictional surfaces into tighter engagement and a tangential force tending to angularly displace said second friction member with respect to said axially movable toothed element when synchronous rotation occurs.

15. The combination of two power transmitting members, one of which is adapted to drive the other, including toothed intermeshable elements connectible and disconnectible by relative movement of one toward or from the other; a friction member in positive torque transmitting relation to each power transmitting member, respectively, one friction member movable into and out of frictional driving engagement with the other to bring the positive power transmitting elements to substantially the same speeds prior to establishing a positive driving connection; one of said friction members being capable of a limited rotary and axial movement with respect to the power transmitting member with which it is in positive torque transmitting relation; detents fixed respectively relatively to that friction member which is capable of said limited rotary and axial movement and with respect to said positive power transmitting member with which the former is in positive torque transmitting relation; said detents being arranged to obstruct intermeshing of the teeth of the toothed intermeshable elements when the last named friction member reaches the limit of said relative rotary movement; and a yieldable device arranged to establish a light friction engagement between the last named friction member and said toothed power transmitting member with which the former is in positive torque transmitting relation and adapted to produce sufficient initial pressure between the friction surfaces of the friction members to effect axial alinement of said detents.

16. The combination of two power transmitting members, one of which is adapted to drive the other, including toothed intermeshable elements one of which is axially fixed to one of said members and the other axially movable with the other; a friction synchronizing element fixed with respect to the axially movable toothed element; a companion friction synchronizing element capable of axial movement and limited rotary movement with respect to said axially fixed toothed element; cooperating detents fixed with respect to said companion friction synchronizing element and said axially fixed toothed element; and means affording a yieldable resistance to relative movement between said axially fixed toothed element and said companion friction synchronizing element.

In testimony whereof I affix my signature.

TRACY B. TYLER.

CERTIFICATE OF CORRECTION.

Reissue Patent No. 18,319. Granted January 5, 1932, to

TRACY B. TYLER.

It is hereby certified that error appears in the printed specification of the above numbered patent requiring correction as follows: Page 6, line 34, claim 14, for the words "a synchronous" read asynchronous; and that the said Letters Patent should be read with this correction therein that the same may conform to the record of the case in the Patent Office.

Signed and sealed this 5th day of April, A. D. 1932.

(Seal)

M. J. Moore,
Acting Commissioner of Patents.